Patented May 16, 1933

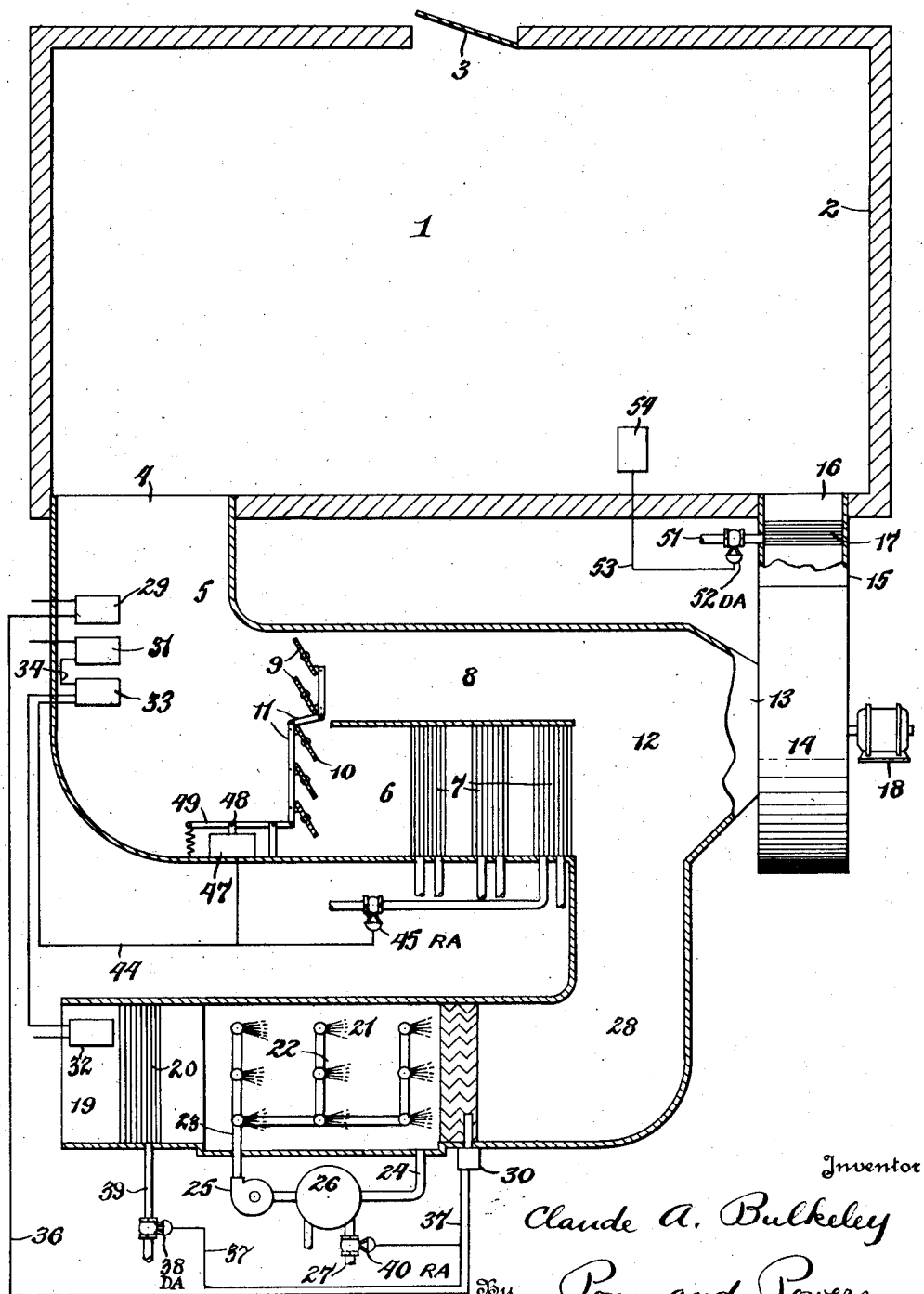

1,909,164

UNITED STATES PATENT OFFICE

CLAUDE A. BULKELEY, OF BUFFALO, NEW YORK, ASSIGNOR TO NIAGARA BLOWER COMPANY, OF BUFFALO, NEW YORK, A CORPORATION OF NEW YORK

VENTILATING APPARATUS

Application filed March 31, 1931. Serial No. 526,646.

This invention relates to an apparatus for cooling, ventilating and conditioning the air of buildings or enclosures such as office buildings, factories requiring special conditions for particular processes or for the comfort of the occupants and for domestic use.

In the ventilation and conditioning of air in buildings, the comfort of the occupants depends not only on the condition of the air itself, but also on the movement of the air through the building. Thus, regardless of the heating, cooling or conditioning as to humidity effected, it is desirable to have a large volume of air circulated through the building. It is also desirable that the temperature of the air inside the building bear a definite ratio to the temperature of the outside air, within, of course, the range of human comfort. Thus it is desirable that the temperature of the air inside the building, bear a definite ratio to the temperature of the outside air so that discomfort is not experienced in passing in and out of the building. Thus it is desirable in the summer time to maintain a temperature in the building approximately ten degrees below the outside temperature. If the temperature in the building is more than ten degrees below the outside temperature, the people coming in experience a chill which not only renders them uncomfortable at the time of entering but may continue through their stay. Furthermore, a very oppressive feeling occurs on passing to the outside if the differential is too great.

The conditions of the air in the building are also subject to fluctuation. In the winter time fresh air must, of course, be provided for ventilation, and must be heated, this being, however, only a part of the air which must be circulated to insure a movement of air sufficient to insure the comfort of the occupants. In summer time fresh air must also be provided for ventilation and this air cooled to maintain the desired ratio between inside and outside temperatures. At the same time it is desirable not to circulate cooled fresh air exclusively through the building because such a large amount of fresh air is not necessary for ventilation and the dehumidification of the entire volume of air necessary to secure the desired air movement would require an unnecessary amount of refrigeration. The air conditions in the room are subject to constantly varying conditions such as the number of people in the room generating heat, whether few or many, the infiltration of heat in summer, the loss of heat through the walls of the building in winter, the heat generated by the lights and other variables and to counteract these variables it is necessary to provide means for supplying air, a part of which is fresh air and all of which is of such controlled temperature as to maintain the desired ratio of inside and outside temperatures to a predetermined minimum and thereafter a constant inside temperature, and at all temperatures to maintain a desired relative humidity in the building.

It is one of the objects of this invention to provide an apparatus for cooling, heating and maintaining the desired relative humidity of the air in an enclosure by introducing a constant quantity of fresh air and a constant quantity of recirculated air, these constant amounts being sufficient to provide the necessary air movement and amount of fresh air for proper ventilation and comfort of the occupants and to provide such a system in which the temperature and humidity of the air introduced into the room is adjusted in response to the inside and outside temperatures in such manner as to maintain the desired conditions of temperature and humidity in the building regardless of the variable influences and during the summer time bearing a ratio to the fluctuating outside air temperatures.

Another object is to provide such a system in which the fresh air is always thoroughly washed and cleaned before being admitted to the room.

Another object is to provide such a system in which the larger proportion of the air handled by the system is air withdrawn from the room, cooled, if necessary, and returned with a smaller proportion of dehumidified fresh air to the room. In dehumidification, it is desirable to reduce the temperature of the air below its dew point to precipitate its excess water and since such dehumidification is applied only to the smaller part of fresh air handled and since the bulk of the recirculated air is very close to the temperature and humidity desired, there is not only a saving in refrigeration through the reduction in the amount of air passed through the dehumidifier, but the heat of the recirculated air is also employed to restore the cold saturated air from the conditioner to the desired temperature and to the desired humidity.

Another purpose is to provide such a system in which the desired temperature in the enclosure is maintained entirely by the heating or cooling and conditioning of the air handled instead of by varying the amounts of fresh and recirculated air admitted to the room, and in which the control of such heating and cooling means is achieved wholly by thermostats thereby avoiding the use of hydrostats which are not only less responsive to air conditions but are also more delicate and liable to get out of order.

Other objects are to provide a system of this character which is less expensive to install and maintain than systems heretofore employed, which is compact and which will efficiently maintain the desired conditions of temperature and humidity in the building with a minimum of attention on the part of the operator in charge.

In the accompanying drawing:

The figure is a diagrammatic, horizontal section through a building equipped with a ventilating system embodying the present invention and showing diagrammatically the arrangement and action of all of the instrumentalities used to carry out the invention.

In its general organization, this invention comprises means for drawing in a constant quantity of fresh air, dehumidifying it and mixing it with a larger constant quantity of recirculated air and means for delivering the mixed air to the building to be conditioned, the excess air in the building escaping through the doors, windows and other openings. A part of the recirculated air can be passed through cooling coils, the amount so passed through cooling coils being determined by dampers regulated in response to the differential between the inside and outside temperatures and the whole of the air admitted to the building can be heated when required, the heating of the air being effected, of course, when heat is required and the cooling coils under such conditions being inoperative. The invention also comprehends a thermostat control for the heaters, coolers and spray water of the conditioner by which the desired temperature and relative humidity is obtained.

The system is shown in connection with the room 1 of a building 2, this room having a door 3 through which air can escape so that an excess pressure is not built up in the room by the constant admission of fresh air. The various rooms 1 of the building are each provided with an air outlet 4 leading to a common duct 5 which communicates with the inlet of a cooling chamber 6 having a plurality of cooling coils 7 through which the recirculated air passing through the cooling chamber 6 passes and is cooled when a cooling medium is flowing through the coils.

Only a part of the recirculated air passes through the cooling chamber 6 and cooling coils 7, the balance passing through a by-pass duct 8. The amount of air passing through the cooling chamber 7 and coils 6 and passing through the by-pass duct 8 is preferably controlled by dampers 9 at the inlet of the by-pass 8 and dampers 10 at the inlet of the cooling chamber 6, these dampers being connected by bars 11 so that they work reversely to one another, i. e., when the dampers 9 are being moved from open to closed positions, the dampers 10 are being moved from closed to open positions and vice versa. The outlets of both the recirculated air cooling chamber 6 and the recirculated air by-pass 8 open into a mixing chamber 12 from which the air is withdrawn into the inlet 13 of a fan 14, the outlet duct 15 of this fan being connected to the fresh air inlets 16 of the rooms 1. The fan 14 delivers a constant quantity of air at a constant velocity and for this purpose is driven by a constant speed motor 18. In each of these inlets is arranged a heater 17 which is operative when heat must be added to the air returned to the room under which conditions the cooling coils 7 are inoperative.

The fresh air is drawn from the outside through a fresh air inlet duct 19 and passes through heating coils 20, these heating coils tempering the cold air in wintertime before it passes through a conditioner 21. In this conditioner the fresh air passes through sprays 22 of refrigerated water, the refrigerated water being supplied through an inlet pipe 23 and the spent spray water being withdrawn from a sump in the conditioner through an outlet pipe 24 by a pump 25 and recirculated through a cooler or interchanger 26 to the inlet pipe 23. A liquid coolant such as brine is supplied to the cooling interchanger 26 through a pipe 27 and when so supplied cools the spray water and thereby lowers the saturated temperature of the air leaving the spray chamber. The air in passing through the conditioner is lowered to a predetermined temperature which in the summer time is generally below the dew point of the fresh air so that in passing through the conditioner, water is removed from the fresh air. This dehumidified air leaves the conditioner 21 saturated and at a lowered temperature and is drawn through eliminator plates and a duct 28 into the mixing chamber 12 where it mingles with the warmer recirculated air and is forced into the room or rooms 1 by the constant capacity fan 14.

It is therefore apparent that in carrying out the present invention, constant proportions of fresh and recirculated air are passed at a constant rate to the room or rooms 1, the amount of air handled and the proportions of fresh and recirculated air handled being the same under all conditions of operation.

If desired, the by-pass duct 8 can be designed to have a restriction or resistance to the air flow equal to the resistance imposed by the cooling coils 7 and the cooling chamber 6, in which case the amounts of recirculated air flowing through the by-pass and the cooling chamber 6 will be the same. Under such conditions, or with proportional resistances to the flow of air the dampers 9 and 10 can be eliminated and the amount of work done by the cooling coils 7 varied to maintain the desired room conditions solely by controlling the flow of refrigerant through the cooling coils 7 as hereinafter described.

The temperature of the air in the room 1 and its relative humidity are controlled by six thermostats 29, 30, 31, 32, 33 and 54. All of these thermostats are supplied with air under pressure from any suitable source (not shown) and are of the direct acting intermediate type, that is, with a constant air pressure supply of, say, 15 pounds supplied at the inlet of each thermostat, the air pressure on the outlet of the thermostat rises with rising temperature of the air in which the sensitive parts of the thermostat are located. Conversely with falling air temperature, the air pressure on the outlet of each thermostat falls. It follows when an intermediate desired temperature is to be maintained by the thermostat that an intermediate outlet pressure is also maintained by each thermostat.

The thermostats 29 and 32 are master thermostats, and the thermostats 30 and 33 are sub-thermostats. A master thermostat has a comparatively wide range of temperature change and corresponding outlet pressure change, often having a range of temperature change of 20° F. to cause an outlet pressure change of 0 to 15 pounds. Such a master thermostat can be made by adjustment to cover different limited ranges, for example, from 75° to 95° F., or from 60° to 80° F. The master thermostats herein used are employed to vary the setting of the corresponding sub-thermostat. For example, as the temperature to which the master thermostat is exposed varies, say, from 95° to 85° F., the outlet air pressure will vary from, say, 15 to 7.5 pounds, which change in air pressure changes the setting of its sub-thermostat, say, from 85° to 75°. The constant interval (in the above example 10°) can be changed by adjustment of the sub-thermostat. Thus the master and sub-thermostat in combination accomplish the purpose of maintaining constant differential temperatures between the two media in which the two instruments are located by having the sub-thermostat control the temperature of one medium.

The thermostat 31 is a stop thermostat which functions through the sub-thermostat 33 when the sub-thermostat 33 is set lower than the stop thermostat 31 and insures the maintenance of a minimum temperature in the room 1.

The thermostats 29, 31 and 33 are located in the recirculated room air duct 5 and hence are responsive to room air conditions; the master thermostat 32 is located in the fresh air inlet 19 and is therefore responsive to the temperature of the outside air and the sub-thermostat 30 is arranged in the eliminator plates at the outlet of the dehumidifier 21 and hence is responsive to the temperature of the saturated air leaving the conditioner. The outlet of the stop thermostat 31 is connected to the inlet of the sub-thermostat 33 by a line 34 and the setting of this sub-thermostat 33 is controlled by the pressure in a line 35 connected with the outlet of the master thermostat 32. The outlet of the master thermostat 29 is connected by a line 36 to the sub-thermostat 30 and controls its setting and the outlet of this sub-thermostat 30 is connected by a line 37 with a reverse acting diaphragm valve 40 in the brine inlet line 27 of the cooler or interchanger 26 which refrigerates the water withdrawn from the sump of the conditioner 21 and is pumped by the pump 25 through the spray water supply pipe 23 to provide the refrigerated sprays 22. The outlet line 37 of the sub-thermostat 30 also connects with a direct acting diaphragm valve 38 in the steam supply line 39 to the heater 20. The direct and reverse acting valves 38 and 40, are of course, so adjusted that they do not overlap in their action, and the steam valve 38 does not open until tempering of the fresh air to the conditioner 21 is needed, as in winter. It will also be understood that, if desired for humidification, a heater could be placed in series with the cooler 41 and the steam supply to this heater controlled from the line 37 by a direct acting diaphragm valve. The outlet line 44 of the sub-thermostat 33 connects with a reverse acting diaphragm valve 45 in the inlet line of the cooling coils 7 and thereby controls the admission of coolant to these coils. The outlet line 44 of the sub-thermostat 33 is also connected to an air motor 47, the piston rod 48 of this motor being connected to the end of a lever 49 which is pivoted at an intermediate point to a stationary support at one end and at its other end is pivoted to the bars 11 connecting the dampers 9 and 10.

As previously described, in each of the mixed air inlets 16 to the rooms 1 a heater 17 is arranged. Each of these heaters 17 is supplied with steam by a steam pipe 51 having a direct acting diaphragm valve 52 and this diaphragm valve is connected by a line 53 with a thermostat 54 so that when the temperature in the corresponding room 1 drops to a definite desired minimum, the thermostat 54 reduces the outlet pressure in the line 53 and operates the direct acting diaphragm valve 52 to admit steam to the heater 17 and heat the mixed air admitted to the room and thereby maintain this minimum temperature. It will be noted that each room 1 has an individual heater 17 and thermostat 54 so that the minimum temperature in each room can be maintained as desired.

Operation

With the system organized as shown, and with the fan 14 operating at a constant speed, fresh air is drawn through the fresh air inlet 19, through the sprays 22 of the air conditioner 21, where it is cooled below its dewpoint, dehumidified and leaves the air conditioner saturated. Any entrained moisture is removed on passing through the eliminator plates at the outlet of the conditioner 21 and the cold dehumidified saturated fresh air passes through the duct 28 to the mixing chamber 12.

The air in the room or rooms 1 is withdrawn through the outlets 4, duct 5 and then takes two paths, one through the by-pass 8 and the other through the cooling chamber 6 and cooling coils 7. The by-passed and the cooled recirculated room air mingles with the fresh air in the mixing chamber 12 and the mixed air is drawn through the fan and is delivered through the duct 15, heater or heaters 17 and outlets 16 to the rooms 1.

It is therefore apparent that at all times constant proportions and amounts of fresh and recirculated room air are handled by the system.

Assuming summer operation, when the temperature inside rises, the sub-thermostat 33, which is responsive to the room air temperatures, raises the pressure in its outlet line 44. Or if the outside air temperature rises, the master thermostat 32 responsive to this temperature increases the pressure on its outlet line 35 to adjust the setting of the sub-thermostat 33 and increase the pressure in its outlet line 44. In either case this increased pressure in the outlet line 44 operates the motor 47 to open the dampers 10 and close the dampers 11 and acts on the reverse acting diaphragm valve 45 to open it and admit more coolant to the cooling coils 7. A greater amount of air is therefore passed through the cooling coils 7 and the air going through the cooling coils 7 is therefore cooled to a greater extent and as this air is mixed with the by-passed air and the fresh air, it lowers the temperature of the whole so that the air delivered to the room 1 is cooler.

The rising temperature of the room air also acts on the master thermostat 29 to admit more pressure to its outlet line 36 and this sets the sub-thermostat 30 to admit more pressure to its outlet line 37. The rising pressure in the sub-thermostat outlet line 37 continues to hold the direct acting diaphragm valve 38 closed so that the heater 20 is inoperative and also progressively opens the reverse acting valve 40 to admit more coolant to the cooler 26. This drops the temperature of the spray water forming the sprays 22 in the conditioner 21 and since the temperature of the saturated air leaving the conditioner is dependent in part upon the temperature of the spray water, the lowering of the temperature of the spray water continues until the saturated temperature of the fresh air leaving the spray chamber reaches the temperature for which the sub-thermostat 30 is set to maintain. Since the amount of dehumidification or water taken out of the fresh air depends on the temperature of the saturated air leaving the spray chamber 21, it is apparent that as the temperature of the air in the room rises, the dehumidification of the fresh air is increased and that thereby the humidity in the room 1 is controlled.

When the outside temperature drops, the master thermostat 32 reduces the pressure in its outlet line 35 and adjusts the setting of the sub-thermostat 33 to reduce the pressure in its outlet line 44. Or if the room temperature drops, through the thermostat 33, the pressure in its outlet line 44 is reduced.

This reduction of pressure in the outlet line 44 closes the reverse acting diaphragm valve 45 proportionally and reduces the flow of coolant to the coils 7 thereby raising the temperature of the air delivered to the room. At the same time this lowering pressure in the outlet line 44 operates the motor 47 to close gradually the dampers 10 and to open the dampers 9 so that a proportionally greater amount of the recirculated air is not passed through the coils 7 but is by-passed through the by-pass 8. This continues until the flow of coolant to the coils 7 is completely cut off.

At the same time the lowering temperature in the room 1, through the master thermostat 29 reduces the pressure in the outlet line 36 and adjusts the setting of the sub-thermostat 30 to reduce the pressure in the outlet line 37. The reduction in pressure in the outlet line 37, through the reverse acting diaphragm valve 40 gradually cuts off the flow of coolant to the cooler 41, raises the temperature of the spray water and the saturated temperature of the air leaving the spray chamber 21 and thereby reduces the dehumidification of the fresh air. When the flow of coolant to the cooler 26 is completely cut off (as in winter) the falling pressure in line 37 opens the direct acting diaphragm valve 38 so as to heat the incoming fresh air. Since under these conditions the spray water is merely recirculated and it assumes the temperature of the fresh air so that the air leaves the spray chamber saturated at a higher wet bulb temperature than outside. In other words, the fresh air is humidified.

The combination of the master thermostat 29 and the sub-thermostat 30 serve to hold the relative humidity in the building well within the range of human comfort. This is true since the master thermostat 29, subject to the room temperature, controls the setting of the sub-thermostat 30, subject to the saturated temperature of the air leaving the conditioner. This assures that the dew point of the air leaving the conditioner will always be the required number of degrees below the room temperature thus assuring control of the relative humidity of the room. For example, assume that the master thermostat 29 and sub-thermostat 30 are set to maintain a saturated temperature of the air leaving the conditioner 20° below that of the room. When this saturated fresh air, together with the recirculated room air, assumes the temperature of the room (after being delivered to the room) the relative humidity in the room will be approximately 50% or well within the range of human comfort. By having the temperature of the room and the saturated temperature of the air leaving the conditioner walk up and down together in this manner, the relative humidity in the room can be maintained within very close limits without using any hygrostat control whatsoever.

Preferably in installations in buildings for the comfort of occupants the total volume of air handled is sufficient to do the greatest amount of required cooling when about 20% of the total volume is fresh air saturated at a temperature of about 20° below room temperature, about 40% of this total is recirculated room air at room temperature and the remaining 40% is recirculated air cooled about 15° below room temperature. Thus the average minimum temperature of the air delivered is not to exceed 10° below that of the room. This assures a dew point of the room air about 20° below room temperature giving about 50% relative humidity and yet the maximum average difference between the temperature of the room and the air supplied is never greater than 10° thus giving a relatively rapid air movement in the room without cold drafts as would occur were less air supplied at a greater differential in temperature.

In order that a predetermined minimum temperature in the room be provided, the stop thermostat 31 is provided. As previously explained, the master and sub-thermostats 32 and 33, in combination, tend to maintain a constant differential say of ten degrees, between the outside and the inside air by regulating the coolant to the coils 7 and the dampers 9 and 10. Obviously in the winter, this should not occur and hence when the room temperature drops to the desired minimum to be maintained at all times, the stop thermostat 31 cuts off the pressure supply to the sub-thermostat 33 so that it is wholly inoperative and cannot open the reverse acting diaphragm valve 45. Therefore when the room temperature drops to this predetermined minimum, the valve 45 cannot be opened and hence the recirculated air is not cooled in passing the coils 7.

When the room temperature drops below this minimum, the air entering the room must be heated to restore it to this desired minimum. For this purpose, each heater 17 is controlled by a direct acting diaphragm valve 52 and a thermostat 54 in each room so that in the winter time the temperature in each room can be varied to suit its individual requirements.

From the foregoing description, it is apparent that all of the forms of the present invention provide an apparatus for conditioning buildings in which, (1) by maintaining a constant desired differential in temperature between the room 1 or duct 5 and the dew point of the air leaving the conditioner 21, the relative humidity in the room 1 is properly controlled at all times, (2) during warm weather the temperature of the air in the room 1 is maintained a constant number of degrees below that outside until the desired minimum room temperature falls to, say 70°, thus avoiding too cold an inside temperature as compared with that outside, (3) all fresh outside air delivered into the room is always thoroughly washed and cleansed of dust and dirt and is always dehumidified or humidified as required to maintain proper control for the greatest health and comfort of the occupants, (4) a saving of both steam and refrigerant is effected since both cannot be turned on simultaneously, (5) both steam and refrigerant are saved by controlling the total volume of air handled as the room gradually falls in temperature due to a reduction in the amount of heat to be absorbed in the room caused by a decrease in heat generation, (6) the total volume of air handled is always the same and always sufficient to maintain a proper air circulation through the room though only a small part of this is dehumidified or humidified fresh air, and at the same time the differential between the temperature of the air delivered and the air in the room is so small as not to cause uncomfortable cold drafts.

I claim as my invention:

1. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room and means responsive to the air conditions in said room for tempering a part of said withdrawn air.

2. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room and before mixture with said conditioned fresh air and means responsive to the air conditions in said room and controlling the effect of said cooling means.

3. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room and before mixture with said conditioned fresh air and means responsive to the temperature of the outside fresh air and to the heat load in said room and controlling the effect of said cooling means to maintain a substantially constant differential between the room temperature and the outside air temperature during relatively high ranges of said temperatures.

4. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room and before mixture with said conditioned fresh air and means responsive to the temperature of the outside fresh air and to the heat load in said room and controlling the effect of said cooling means to maintain a substantially constant differential between the room temperature and the outside air temperature during relatively high ranges of said temperatures comprising a sub-thermostat responsive to the temperature of the air in said room and controlling the effect of said cooling means and a master thermostat responsive to outside air temperatures and controlling the setting of said sub-thermostat.

5. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room before mixture with said conditioned fresh air, means for by-passing a part of said air withdrawn from said room around said cooling means, and means controlling the effect of said cooling means in response to air conditions in said room.

6. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room before mixture with said conditioned fresh air, means for by-passing a part of said air withdrawn from said room around said cooling means, and means controlling the effect of said cooling means in response to air conditions in said room, comprising dampers controlling the flow of air through said by-pass, dampers controlling the flow of air through said cooling means, a motor for moving said dampers in opposition to one another and a thermostat responsive to the heat load in said room for controlling said motor.

7. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from the room before mixture with the conditioned fresh air, means for by-passing a part of said air withdrawn from said room, the resistance of said cooling means to the flow of air having a fixed relation to that of said by-pass means, means for controlling the amount of coolant supplied to said cooling means and means responsive to the heat load in said room for controlling said coolant controlling means.

8. In an apparatus for ventilating and conditioning the air in a room or the like, means for continuously withdrawing air from the room to be conditioned, an air conditioner, means for drawing an amount of fresh air through said air conditioner at all times proportional to said withdrawn room air, means for mixing said conditioned fresh air and said withdrawn room air and discharging said mixed air into said room, cooling means in the path of the air withdrawn from said room and before mixture with said conditioned fresh air, means responsive to the air conditions in said room and controlling the effect of said cooling means at relatively high room temperatures, means for heating said mixed air and means responsive to the air conditions in said room and controlling the effect of said heating means at relatively low room temperatures.

9. In an apparatus for ventilating and conditioning the air in a room or the like, an air conditioner, means for continuously drawing a constant amount of fresh air from the outside and passing said fresh air through said conditioner, means for continuously withdrawing air from the room to be conditioned, means for mixing said conditioned fresh air and said air withdrawn from said room and discharging said mixed air into said room, cooling means in the path of the air withdrawn from said room and before mixture with said conditioned fresh air and means responsive to the air conditions in said room and controlling the effect of said cooling means.

10. In an apparatus for ventilating and conditioning the air in a room or the like, an air conditioner, means for continuously drawing a constant amount of fresh air from the outside and passing said fresh air through said conditioner, means for continuously withdrawing air from the room to be conditioned, means for mixing said conditioned fresh air and said air withdrawn from said room and discharging said mixed air into said room, cooling means in the path of the air withdrawn from said room and before mixture with said conditioned fresh air and means responsive to the temperature of the outside fresh air and to the heat load in said room and controlling the effect of said cooling means to maintain a substantially constant differential between the room temperature and the outside air temperature during relatively high ranges of said temperatures.

11. In an apparatus for ventilating and conditioning the air in a room or the like, an air conditioner, means for continuously drawing a constant amount of fresh air from the outside and passing said fresh air through said conditioner, means for continuously withdrawing air from the room to be conditioned, means for mixing said conditioned fresh air and said air withdrawn from said room and discharging said mixed air into said room, cooling means in the path of the air withdrawn from said room before mixture with said conditioned fresh air, means for by-passing a part of the air withdrawn from said room around said cooling means and means controlling the effect of said cooling means in response to air conditions in said room.

In testimony whereof I hereby affix my signature.

CLAUDE A. BULKELEY.

DISCLAIMER 1,909,164.—*Claude A. Bulkeley*, Buffalo, N. Y. VENTILATING APPARATUS. Patent dated May 16, 1933. Disclaimer filed February 23, 1937, by the assignee, *Niagara Blower Company;* the patentee, approving and joining.

Hereby enters this disclaimer to claims 1, 2, 5, 7, 8, 9, and 11 in said Letters Patent.

[*Official Gazette April 6, 1937.*]